Figure 1:
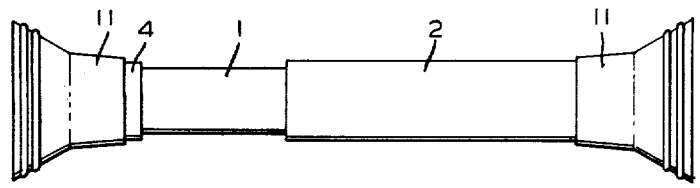

United States Patent Office 3,111,821
Patented Nov. 26, 1963

3,111,821
SNAP-ON SHAFT GUARD
Douglas Austen Edwards, Wednesbury, Staffs, and John Ronald Summers, Balsall Common, England, assignors to Birfield Engineering Limited, London, England
Filed Mar. 19, 1962, Ser. No. 180,684
10 Claims. (Cl. 64—4)

This invention relates to mounting means, and in particular to means for mounting a tubular component on a shaft component through a ball bearing to allow relative rotation of the two components.

The invention is advantageously applied to the mounting of a tubular transmission guard, which then forms the tubular component, on and around a transmission shaft to be guarded. The shaft component may, for example, be a transmission shaft providing a drive to an agricultural implement from the power take-off of an agricultural tractor. In this case the guard is normally supported by end bearings on the inner yoke members of universal joints of the shaft, and it is then desirable that the guard be arranged for easy fitting and removal in the field and yet securely held against accidental dislodgment. The main object of the invention is to provide a shaft guard which can be designed for such an application so as to be fitted to and removed from the shaft in the field rapidly, simply and without the use of tools and yet is firmly held against accidental dislodgment.

According to the invention, means for mounting a tubular component on a shaft component comprise a circumferentially split outer bearing race mounted in a bearing housing of the tubular component, the split portions of the race being movable apart axially of the bearing against resilient means urging them to their normal position in which between them they define an outer ball track for a ring of bearing balls arranged within the race and mounted in a cage which prevents them falling radially inwards sufficiently for the ball and cage assembly to leave the race.

The bearing of the mounting means enables the tubular component to be mounted on an inner bearing race defining a corresponding inner ball track, relative axial movement of the shaft component and the inner race to position the latter within the outer race moving the balls radially outwards to part the split portions of the outer race. When the inner ball track is correctly positioned relatively to the outer track the portions move together under the influence of said resilient means to their normal position which moves the balls inwards into bearing engagement with the inner ball track. Thus, the invention provides for the tubular component which is, in effect, a resilient "snap-on" connection to the inner race.

The tubular component is conveniently a transmission shaft guard, and when the guard is designed for use with an agricultural shaft the inner race will normally be fixed on or formed integrally with the inner yoke member of a universal joint of the shaft. In this case it is normally desirable for the connection to have a one-way action, so that the guard can be fitted on to the yoke member in one direction and not removable by an axial force in the opposite direction. To this end the leading portion of the split race, with respect to the disposition of the latter during fitting, may be located against axial displacement away from the other portion, for example being urged against an abutment by said resilient means which allow the other portion to move against them.

To facilitate removal of the guard from the shaft, means may be provided to enable the outer race portions to be moved apart manually. Such means may comprise one or more projections, such as integral lugs, or a member attached thereto which projects through an aperture in the bearing housing.

The resilient means urging the split portions together conveniently comprise a spring, for example a crimped spring ring mounted in the housing in engagement with the outer race.

Figure 2:
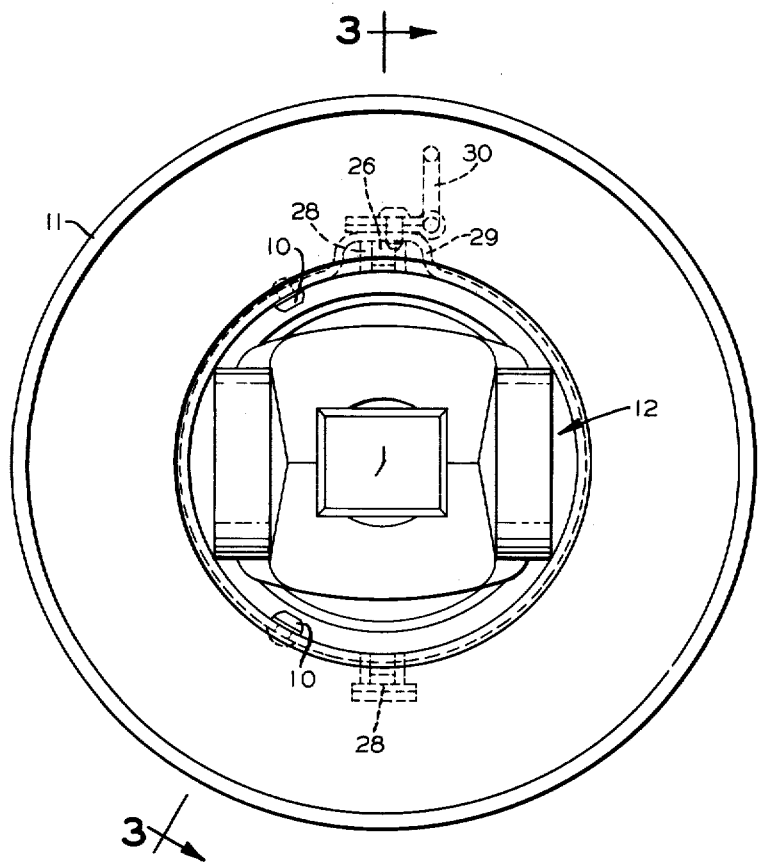
Figure 3:
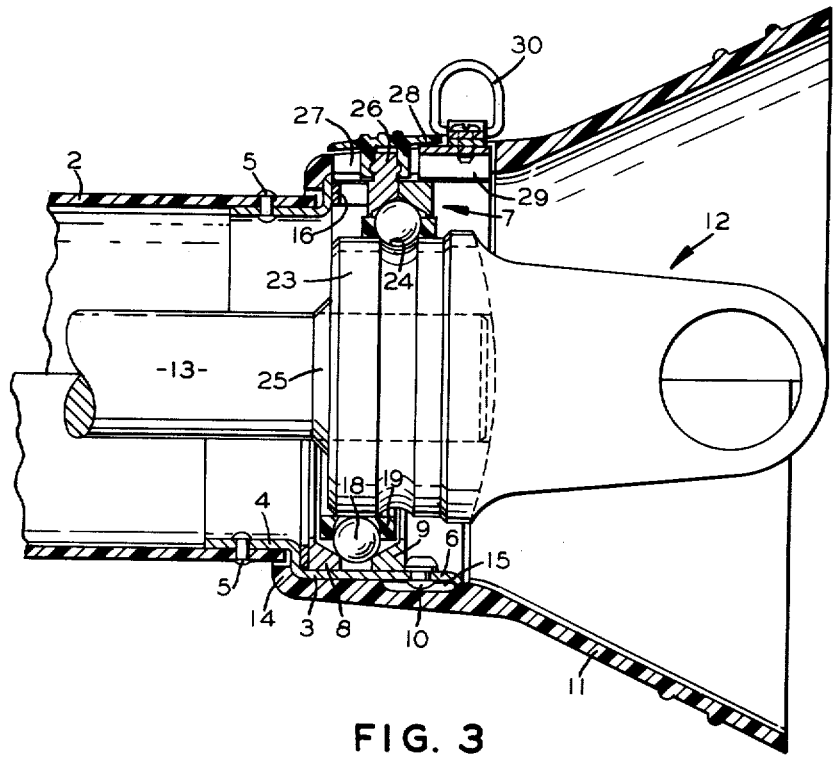
Figure 4:
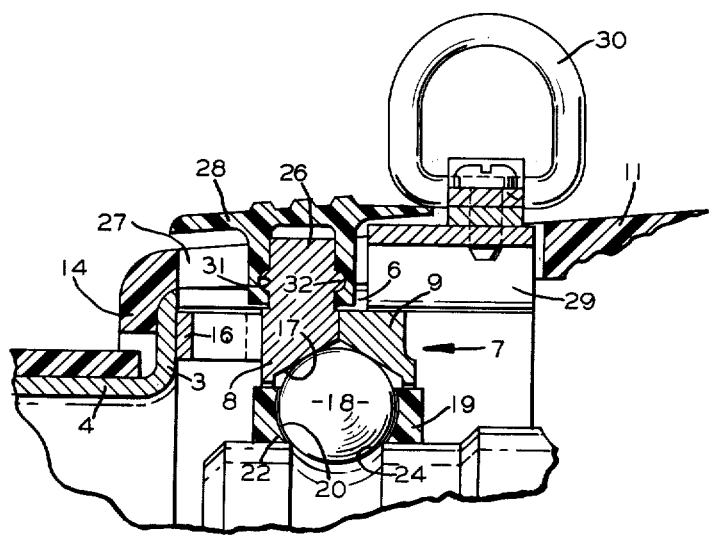

The invention will now be further described with reference to the accompanying drawings which illustrate, by way of example, a telescopic shaft guard in accordance with the invention fitted to an agricultural transmission shaft, and in which:

FIG. 1 is a side view,
FIG. 2 is an end view,
FIG. 3 is a section on the line 3—3 in FIG. 2 showing the shaft guard connected to the shaft at the upper portion and disconnected at the lower portion, and
FIG. 4 is a detail of FIG. 3 to a larger scale.

The guard comprises a central tubular portion formed by two sections 1 and 2 of circular cross-section in telescopic engagement. At the outer end each tubular section 1 or 2 is riveted to the inner end of a corresponding metal bearing housing such as 3.

Each bearing housing 3 is stepped with a smaller diameter section 4 to which the corresponding tubular section 1 or 2 is fitted and attached by rivets 5, and a larger diameter section 6 within which an associated bearing 7 is housed. The two bearing housings 3 and bearings 7 are similar, and the guard section 2 fits outside the housing section 4 whereas the tubular section 1 fits within the corresponding housing section 4. The outer race of each bearing 7 is split circumferentially into two portions 8 and 9, the outer portion 9 abutting against a series of angularly spaced inwardly projecting retaining pegs 10 fitted through the wall of the housing portion 6 from the outer side thereof.

Apart from the differences already described the telescopic parts of the guard are generally similar, and hence only the right-hand part as seen in FIG. 1 will now be described in detail, with particular reference to FIGS. 2 to 4.

A detachable flared end section 11 of plastic material shrouds a universal joint 12 at the corresponding end of the transmission shaft 13. In FIG. 3 only the inner yoke member of the corresponding universal joint 12 is shown, and it will be seen that the yoke member is completely shrouded by the end section 11. The section 11 is moulded with an inner end lip 14 such that the section can be "sprung" into position on the outer housing section 6 so that the lip 14 engages behind the section 6 and retains the end section 11 in position. The section 11 is formed with internal recesses such as 15 which register with and house the heads of the retaining pegs 10. Thus, when mounted on the bearing housing 3 the end section 11 holds the pegs 10 in position.

The inner split portion 8 of the bearing race is a sliding fit within the outer housing section 6 and is urged to a normal position abutting the outer race portion 9, as resilient means comprising a crimped spring ring 16 between the race portion 8 and the step between the inner and outer housing sections 4 and 6. In such normal position the portions 8 and 9 define between them an outer ball track 17 of V shape in radial cross section; the portion 8 has a chamfer of about 50° and the portion 9 has a chamfer of about 35° with respect to the bearing axis in each case, as shown in FIG. 4, with the two chamfers between them forming the track 17. The split portions 8 and 9 are of sintered iron.

A ring of bearing balls such as 18 within the outer race 8, 9 is mounted in a nylon cage 19 which is freely floating and formed with seating such as 20 for the balls 18. As shown more particularly in FIG. 4 the form of the seatings 20 is such that they in effect provide inner retaining lips 22 which, when the guard is not mounted on the shaft 13, prevent the balls 18 falling radially inwards sufficient for the cage and ball assembly 18, 19 to fall out or be withdrawn from within the outer race 8, 9.

The yoke member 12 has a generally cylindrical inner portion 23 forming an inner bearing race of the bearing 7 and on which an inner bearing track 24 for the balls 18 is machined. The yoke portion 23 is chamfered at 25 to provide a lead assisting fitting of the guard in a manner now to be described.

During fitting the guard is offered up to the shaft 13 from the inner end of the corresponding shaft portion, as usual the shaft 13 being formed in two telescopic portions which can be separated prior to fitting the guard. This is done with the outer race 8, 9, the cage 19 and the balls 18 of the bearing 7 already assembled and positioned within the bearing housing 3, and the lead on the yoke portion 23 moves the balls 18 radially outwards to move the race portions 8 and 9 apart against the spring 16 with a wedging action. It has been found in practice that this operation is assisted by simultaneous partial rotation of the guard on the yoke member.

The race portions 8 and 9 move apart until the balls 18 fit between them the cylindrical yoke portion 23, i.e., to the resultant position shown in the lower half of FIG. 3. This enables the bearing 7 to pass over the cylindrical yoke portion 23 until the balls 18 are aligned with the inner ball track 24. When this position is reached the spring ring 16 moves the race portions 8 and 9 together to the normal position and hence moves the ball 18 inwards into engagement with the inner track 24 and locks the guard in position on the yoke member of the joint 12. The arrangement is such that any axial loading on the guard is transmitted more or less normally to the outer bearing track 17.

In use axial loads tending to dislodge the guard act in a direction to move the yoke member of the joint 12 outwardly from the guard, and the resulting axial load is thus applied to and tends to move the outer race portion 9. This is prevented by abutment of that portion on the retaining pegs 10, so that accidental dislodgment is prevented which is an important safety feature of the described arrangement.

Although it is important that the guard be held against accidental dislodgment it is also necessary for it to be capable of easy withdrawal from the shaft 13 when desired. To this end the race portion 8 has two outwardly projecting diametrically opposed lugs 26 which project through axially directed slots 27 in the housing portion 6 and the end section 11. A plastic grommet or button 28 is fitted on each lug 26 after the race portion 8 is fitted within the bearing housing 3, and the buttons 28 allow the race portion 8 to be slid back by hand against the spring 16 to part the race portions 8 and 9. This frees the balls 18 for radially outward movement and hence allows the guard to be withdrawn from the shaft 13.

In order to allow the race portion 8 to be fitted within the bearing housing 3 the outer section 6 of the latter is formed with a "hump" 29 in line with one of the slots 27. This allows the race portion 8 to be fitted by first inserting the corresponding lug 26 into the slot 27 in line with the hump 29. A D ring 30 fitted to the hump 29 provides an attachment by which the guard can be anchored as may be required by safety regulations.

The release buttons 28 are moulded from a synthetic plastic material such as nylon with two transverse grooves 31 which fit over ribs 32 on the lugs 26 to retain the button 28 after it has been sprung to position.

What is claimed is:

1. A connecting means comprising an inner member having means forming an inner race, an outer member rotatable relative to said inner member, a resiliently deformable race carried by said outer member, bearing means in said races for connecting said members against relative axial movement, and externally accessible manually operable means for deforming said outer race to effect disconnection of said members.

2. A connecting means comprising an inner member having means forming an inner race, an outer member rotatable relative to said inner member, a deformable outer race carried by said outer member resiliently operatively engaging one of said members and biasing race for inhibiting the deformation thereof, bearing means in said races for connecting said members against relative axial movement, cage means for said bearing means, externally accessible manually operable means for deforming said deformable race to effect disconnection of said members, said cage means preventing radial inward movement of said bearing means when said members are disconnected.

3. A connecting means comprising an inner shaft having an inner race provided thereon, an outer tubular member rotatable relative to said inner shaft member, a circumferentially split outer race member comprising a pair of portions carried by said outer tubular member, an annulus of balls positioned in said outer and said inner races, resilient means normally urging said split outer race portions together whereby said annulus of balls is seated in said outer and said inner races to connect said inner and outer members against relative axial movement, one of said outer race portions being movable axially against the bias of said resilient means whereby said annulus of balls may be removed from said inner race to effect disconnecting of said outer and inner members.

4. A connecting means as defined in claim 3 including cage means for said annulus of balls preventing radial inward movement of said balls when said outer and inner members are disconnected.

5. The connecting means as defined in claim 3 including means extending externally of said outer member and being connected to said one outer race portion for effecting movement thereof.

6. A connecting means comprising an inner shaft member having an inner race means provided thereon, an outer tubular member rotatable relative to said inner shaft member, a split outer race member comprising a pair of portions carried by said outer tubular member, an annulus of balls positioned in said outer and said inner races, resilient means normally urging said split outer race portions together whereby said annulus of balls is seated in said outer and said inner races to connect said inner and outer members against relative axial movement, and means extending externally of said outer member and being connected to said split outer race, said last named means being manually operable to separate said split outer race whereby said annulus of balls may be removed from said inner race to effect disconnecting of said outer and inner members, and cage means for said annulus of balls preventing radial inward movement of said balls when said outer and inner members are disconnected.

7. A connecting means comprising an inner member having means forming an inner race, an outer tubular member rotatable relative to said inner member, a circumferentially split outer race comprising a pair of portions carried by said outer tubular member, resilient means normally urging said outer race portions together, an annulus of balls positioned in said inner and outer races for connecting said inner and outer members, means preventing movement of said outer race in one direction whereby forces in said one direction are not effective to disconnect said inner and outer members, manually operable means connected to one of said portions of said outer race for moving said one portion against the bias of said resilient means whereby said balls may be removed from said inner race to effect disconnection of said inner and outer members.

8. A connecting means comprising a power transmission shaft having means thereon forming an inner race, a shaft guard telescoped over said power transmission shaft, an outer race means positioned in said shaft guard for rotation therewith and comprising a first and a second race forming portion, abutment means carried by said shaft guard and extending inwardly therefrom and engaging said first outer race portion, resilient means biasing said second outer race portion into engagement with said first outer race portion thereby forming an outer race, an annulus of balls positioned in said inner and outer races for connecting said shaft guard to said power transmission shaft while permitting relative rotation therebetween, means extending outwardly of said shaft guard and connected to said second outer race portion and being manually operable to move said second outer race portion against the bias of said resilient means whereby said annulus of balls is permitted to move outwardly from said inner race to effect disconnection of said shaft guard from said power transmission shaft, and cage means for said annulus of balls preventing radial inward movement of said balls upon disconnection of said shaft guard from said power transmission shaft.

9. A connecting means comprising a power transmission shaft having means thereon forming an inner race, a shaft guard telescoped over said power transmission shaft, an outer race means carried by said shaft guard for rotation therewith and comprising a first and a second outer race forming portion, abutment means carried by said shaft guard and extending inwardly therefrom and engaging said first outer race portion, resilient means biasing said second outer race portion into engagement with said first outer race portion, said outer race portions being chamfered to form a substantially V-shaped outer bearing race in cross section, an annulus of balls positioned in said inner and outer races for connecting said shaft guard to said power transmission shaft against relative axial movement while permitting relative rotation therebetween, a projection on said second outer race portion extending outwardly of said shaft guard and being manually operable to move said second outer race portion against the bias of said resilient means whereby said annulus of balls is permitted to move outwardly from said inner race to effect disconnection of said shaft guard from said power transmission shaft, and an annular cage member for said annulus of balls preventing radial inward movement of said balls upon disconnection of said shaft guard from said power transmission shaft.

10. The connecting means as defined in claim 9 wherein said resilient means comprises a crimped spring ring.

References Cited in the file of this patent

UNITED STATES PATENTS

| | | |
|---|---|---|
| 2,793,512 | Larsen | May 28, 1957 |
| 2,919,562 | Weasler | Jan. 5, 1960 |
| 3,044,278 | Geisthoff | July 17, 1962 |

UNITED STATES PATENT OFFICE
CERTIFICATE OF CORRECTION

Patent No. 3,111,821                        November 26, 1963

Douglas Austen Edwards et al.

It is hereby certified that error appears in the above numbered patent requiring correction and that the said Letters Patent should read as corrected below.

Column 2, line 58, before "resilient" insert -- shown in the upper half of FIG. 3 and in FIG. 4, by --.

Signed and sealed this 28th day of April 1964.

(SEAL)
Attest:

ERNEST W. SWIDER
Attesting Officer

EDWARD J. BRENNER
Commissioner of Patents